United States Patent [19]

Traxler et al.

[11] Patent Number: 5,720,160
[45] Date of Patent: Feb. 24, 1998

[54] VACCUM CENTRIFUGE WITH MAGNETIC BEARINGS AND SEALING METHOD

[76] Inventors: Alfons Traxler, Gutstrasse 38, Ch-8400, Winterthur, Switzerland; Friedrich König, Mahlbergweg 5, D-76275, Ettlingen, Germany

[21] Appl. No.: 503,786

[22] Filed: Jul. 18, 1995

[30] Foreign Application Priority Data

Jul. 23, 1994 [CH] Switzerland ............... 2316/94

[51] Int. Cl.$^6$ ............... D01H 7/74; D01H 1/08
[52] U.S. Cl. ............... 57/76; 57/77; 310/90.5
[58] Field of Search ............... 57/261, 313, 312, 57/76, 77, 267; 310/90.5

[56] References Cited

U.S. PATENT DOCUMENTS 5,382,007  1/1995  Hartel et al. ............... 57/76

FOREIGN PATENT DOCUMENTS

| 1361785 | 12/1964 | France ............... 57/76 |
| 1123239 | 12/1955 | Germany ............... 57/76 |
| WO9425650 | 11/1994 | WIPO . |

*Primary Examiner*—William Stryjewski
*Attorney, Agent, or Firm*—Webb Ziesenheim Bruening Logsdon Orkin & Hanson, P.C.

[57] ABSTRACT

A vacuum centrifuge has a cylindrical centrifuge housing forming a vacuum chamber and a cylindrical centrifuge pot is coaxial with the vacuum chamber. An elongated hollow shaft extends externally and coaxially from the cylindrical centrifuge pot and forms a passage for an elongated thread carrier tube extending into the pot. At least one magnetic bearing and a motor surround the elongated hollow shaft. An annular wall connects a terminal end of the elongated hollow shaft to the cylindrical centrifuge pot and forms a boundary surface within the vacuum chamber in which the centrifuge pot is located.

7 Claims, 4 Drawing Sheets

VACCUM CENTRIFUGE WITH MAGNETIC BEARINGS AND SEALING METHOD

BACKGROUND OF THE INVENTION

1. Field of the Invention

This invention relates to a vacuum centrifuge with magnetic bearings, called centrifugal for short, which is used in centrifugal spinning processes or multi-stage spinning processes.

2. Description of the Prior Art

Staple fiber yarns can be produced by the conventional self-actor mule method, by the ring and rotor spinning frame methods and also by centrifugal spinning methods.

A distinction is made between two types of centrifugal spinning methods: pure centrifugal spinning methods and multi-stage spinning methods. In the first method, a fully twisted yarn is laid down in the centrifuge. In the multi-stage spinning method, a yarn with a partial twist is spun into a centrifuge, and after the centrifuge has been filled, and with the centrifuge remaining in rotation, the yarn is spooled out of the centrifuge, during which process the remaining twist is imparted to the yarn. In centrifugal spinning, the centrifuge is full at the end of a work cycle, and in multi-stage spinning the centrifuge is empty.

The prior art (PCT/EP 93/01078) discloses that such centrifuges can be designed in the shape of a bottle. The bottle-shaped centrifuge rotates in a housing in a vacuum, whereby the pressure inside the centrifuge is the normal pressure required for spinning. Such a centrifuge design requires only a small amount of energy to keep it in rotation, since there is little or no air friction.

To operate economically the centrifuge must reach the highest possible speed of rotation, which is limited by the friction strength of the yarn being produced, and leads to a centrifuge with a maximum inside diameter. The lower limit for the length of the centrifuge pot is determined by the technologically necessary minimum knot-free length of the batch of yarn being spun, which is a function of the desired fineness of the yarn to be produced (approximately 30–50 g yarn). The length of the centrifuge pot is limited by the dynamic behavior of the centrifuge in rotation and the resulting forces on the corresponding bearings.

Therefore, a relatively large body which is mounted in a housing is rotating at a high circumferential velocity. The surface is sealed with respect to the outside atmosphere, while normal pressure prevails in the interior, which is accessible through the opening through which the yarn is introduced. For reasons relating to spinning technology, the useful load changes constantly as a result of the introduction of new yarn material, which in turn results in a changing load on the bearings. The radial bearings must therefore be designed for long-term, continuous, reliable operation with a low degree of wear, for high circumferential velocities and for possible operation under dirty conditions, and in a vacuum. The axial bearings must also have a high axial rigidity with regard to the seal of the centrifuge body against the external air pressure. Conventional bearings (ball bearings, friction bearings, air bearings, fluid bearings) are unable to meet some or all of these requirements.

Magnetic bearings are one solution to the problem for this application. But the solutions of the prior art have not solved all of the problems. For example, active magnetic bearings with a laminated rotor cannot withstand the required high circumferential velocities of the centrifuge pot, since the yield points of conventional magnetic materials in the laminated part of the rotor are exceeded. Moreover, the eddy currents generated during frictionless bearing of the rotating centrifuge in a vacuum cause cooling problems which, over the long term, can lead to conditions which exceed the allowable temperature limits for the spinning process. The same is true for the heat loss of the operating elements when they are components of the centrifuge. Moreover, the seal between the centrifuge and the housing is problematic in the range of speeds above 80,000 rpm and relative velocities of more than 30 m/s between the seal and the centrifuge. Under the boundary conditions indicated above, the bearings of the prior art are incapable of economically achieving long service lives.

The object of the invention is to create a centrifuge which rotates in a vacuum under the specific boundary conditions and requirements of the centrifugal spinning and the multi-stage spinning processes, so that the amount of energy required to achieve rotation and the losses in the rotating system can be kept to a minimum, and in which the cooling problem is solved, whereby a maximum useful life of the seal is achieved which contributes to an increase in the maximum useful life of the overall system.

The purpose of the invention is to make the centrifugal spinning or multi-stage spinning process economical.

SUMMARY OF THE INVENTION

The invention teaches that the solution to the problem of cooling the centrifuge pot as it rotates in a vacuum, to prevent the temperature from exceeding the limits imposed by the spinning technology, is to mount the bottle-shaped centrifuge pot in a cantilevered manner, and to laminate it in the vicinity of the magnetic bearing to minimize eddy current losses. Since the diameter of the centrifuge pot is minimal in the vicinity of the hollow shaft, the circumferential velocity at high speeds of rotation is below the yield limit of conventional sheet steel (e.g. transformer magnetic sheet steel). Since the magnetically active components lie outside the useful load area, this part of the centrifuge pot can be made of lightweight, high-strength material (e.g. carbon fibers). The weight of the centrifuge pot can thereby be minimized, which results in reduced energy consumption during the acceleration of the centrifuge pot.

To discharge the residual heat which is generated in the vicinity of the motor, compressed air is blown onto the changeable thread carrier during the spinning. This cooling air escapes through the cavity between the thread carrier and the throat area of the centrifuge pot, and thus absorbs the thermal energy released. To increase the cooling of the magnetically active elements in the vicinity of the radial bearings, of the axial bearings and of the motor, the seal can be located directly behind the useful load area. In that case, all the magnetically active elements of the centrifuge pot which generate thermal losses rotate in air, and can also discharge heat to the circulating air via their outside surfaces.

The invention also teaches that the active magnetic bearings used are not magnetized radially, but along the axis of the rotor. In that case, there is no need for lamination, since only very small eddy current losses occur on the rotating centrifuge pot. If the spinning centrifuge is to be used for the production of very large batches of yarn, the entire centrifuge pot can be made of magnetically active material (e.g. steel), and the radial magnetic bearings can then be installed in the useful load area. The radial magnetic bearings can also be located outside the area of the useful load in the vicinity of the hollow shaft and on an extension of the cover opposite it, so that the useful load area of the centrifuge pot can be made of lightweight, high-strength material to reduce its weight. For large useful loads, this arrangement of the bearings also results in favorable dynamic characteristics for the rotating centrifuge. The seal can also be located immediately downstream of the useful load area on the head end of the centrifuge, so that the heat which is generated by the rotating centrifuge pot can also be discharged to the circulating outside air.

The prior art discloses magnetic bearings which use a minimum number of active magnets and current sources to achieve a stabilization in five degrees of freedom. To increase the economy, reliability and useful life of the vacuum centrifuge, the invention teaches that the electronic propulsion system can be integrated into the electronic system of the magnetic bearing, so that the actuation of the electronic system of the propulsion and magnetic bearing can be done by the same computer. If, as claimed by the invention, the propulsion system is powered by the same DC intermediate circuit as the bearing magnets, then in the event of a power failure, the energy of rotation of the centrifuge pot is fed back into the DC intermediate circuit, thereby maintaining emergency operation of the magnetic bearings.

The invention teaches that the seal of the rotating centrifuge pot against the normal outside pressure is achieved as described below. The seal lip located on the seal support is pressed by means of a spring which is applied axially to the seal support with a defined force against the sealing surface of the centrifuge pot. In this manner, contact with the sealing surface of the centrifuge pot is always guaranteed, even when the seal lip becomes worn. The corresponding brake then fixes the seal support in position. The electronic system of the axial magnet bearing then enlarges the seal gap until the total friction of the centrifuge pot becomes minimal. The total friction, which consists of the air friction and the friction of the seal lip, is functionally related to the size of the seal gap, and can be determined by the electronic system for the magnetic bearing by evaluating the motor torque. The size of the seal gap can be measured, for example, by the temperature of the seal, the light which is admitted through the seal gap, the vibration of the seal, a measurement of the flow of leakage air, a measurement of the deformation of the seal and a measurement of the torque on the seal or the torque of the motor.

The invention also teaches that the function of the spring can be taken over by the electronic system of the magnetic bearing. In this case, a conductive seal lip can be located on the now immobile seal support, or a seal lip which is provided with a conductive layer can be used which closes an electrical contact when it comes into contact with the sealing surface of the centrifuge pot. The axial magnetic bearing then functions as an actuator and moves the centrifuge pot with the corresponding sealing surface toward the seal lip, until the electrical contact is closed. The electronic system of the axial magnetic bearing then enlarges the seal gap until the total friction of the centrifuge pot has become minimal.

To improve the sealing action, the sealing surface of the centrifuge pot can be oriented so that there is a positive transport action, i.e. so that the air flowing into the vacuum is transported outward. For this purpose, the seal surface can also be provided with a screw-shaped groove to improve the transport effect. To increase the axial tolerances, the invention also teaches that the seal can be designed as a labyrinth seal. The seal gap can be adjusted periodically, e.g. at the beginning and/or at the end of each spin cycle, or continuously.

BRIEF DESCRIPTION OF THE DRAWINGS

The invention is explained in greater detail hereinafter with reference to the embodiments illustrated in the accompanying drawings.

DETAILED DESCRIPTION OF PREFERRED EMBODIMENTS OF THE INVENTION

Figure 1:
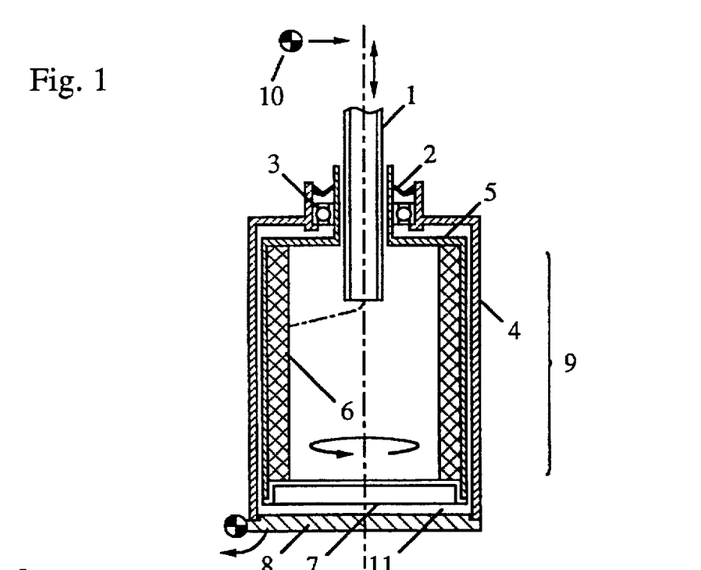
FIG. 1 is a schematic diagram of a vacuum spinning centrifuge for the centrifuge and multi-stage spinning processes.

FIG. 1 shows a schematic diagram of a vacuum centrifuge. Yarn material is fed through thread carrier tube 1 into centrifuge pot 5 which is rotating in a vacuum 11 and twists are thereby imparted to the yarn material. The thread which is thereby formed is uniformly deposited by the changeable thread carrier tube 1 on the wall in useful load area 9. The centrifuge pot 5 is sealed against the outside atmospheric pressure by a seal 2, and is mounted in centrifuge housing 4 by means of a bearing 3.

In the pure centrifugal spinning process, after a complete batch of yarn 6 has been prepared, the feed of new yarn material is interrupted and the speed of rotation is reduced, as disclosed in PCT/EP 93/01078. While the centrifuge pot 5 is still in rotation, housing cover 8 is opened, centrifuge cover 7 is removed and the batch of yarn is removed by suitable means, to prevent a collapse of the batch of yarn 6.

In the multi-stage spinning process, the yarn material is given only a partial twist when it is spun into the centrifuge pot 5. After the desired batch of yarn 6 has been spun, the feed of new yarn material is interrupted. The end of the thread which is formed, and which is outside the centrifuge pot 5, is pulled out backward and a bobbin winder 10 is inserted through the thread carrier tube 1. While the centrifuge pot remains in motion, the bobbin winder 10 winds up the thread, during which process the rest of the rotation is then imparted to the thread. While during the centrifugal spinning process the centrifuge cover 7 must be opened at regular intervals to extract the batch of yarn 6, in the multi-stage spinning process it is only necessary to open the centrifuge cover 7 to remove the residual fibers, if any. In all of the embodiments the thread carrier tube is preferably immovable, i.e. motionless, so that it is easy to blow air or a gas through the tube for to cool the inside of the pot, and the air or gas can emerge through the air gap between the tube 1 and the hollow shaft 2.5.

Figure 2:
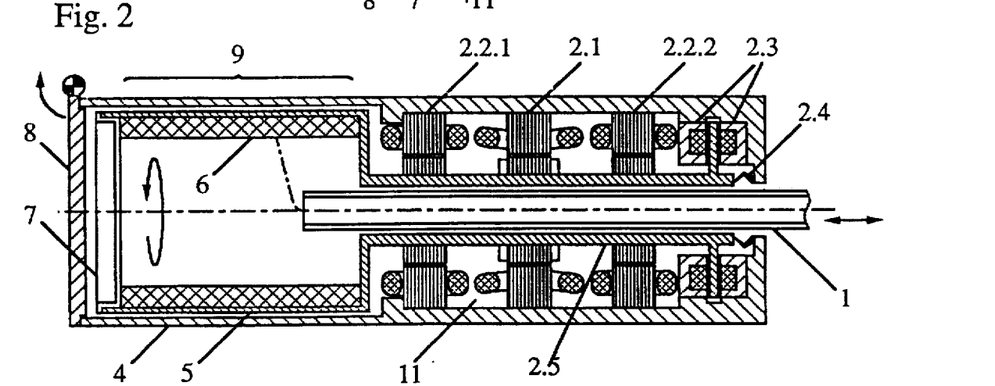
FIG. 2 is a schematic diagram of a vacuum spinning centrifuge mounted in a cantilevered manner with cooling of the magnetically active area by compressed air and a seal with negative transport action.

FIG. 2 is a schematic diagram of the construction of a vacuum centrifuge mounted in a cantilevered manner with compressed air cooling and seal 2.4, which is preferably used for the production of extremely fine yarns with a minimal knot-free length. A bottle-shaped centrifuge pot 5 with a cover 7 is mounted in a cantilevered manner in a centrifuge housing 4. The centrifuge housing has a housing cover 8 for the extraction of the batch of yarn spun during the centrifugal spinning process, or for the removal of the residual fibers in the multi-stage spinning process. Adjacent to useful load area 9 are first radial magnetic bearing 2.2.1, motor 2.1, second radial magnetic bearing 2.2.2 and axial magnetic bearing 2.3. The invention teaches that seal 2.4 which sits on the head end of the centrifuge pot 5 is realized in the form of a contacting head seal or in the form of a contactless gap seal. Since the diameter of the centrifuge pot 5 is minimal in the vicinity of hollow shaft 2.5, when the contact seal 2.4 is used, the circumferential velocity will be below the yield point of the seal material, and when the seal is designed as a gap seal, the gap which is formed will be minimal, which results in a small current of leaking air. The circumferential velocity of the hollow shaft is also below the yield point of conventional sheet metal lamination (e.g. transformer magnetic sheet steel), so that the magnetically active part of the centrifuge pot 5 can be realized in a laminated fashion to minimize the eddy current losses. The invention also teaches the use of active magnetic bearings which are magnetized not radially, but along the rotor axis. The lamination can then be eliminated, since only very small remagnetization losses occur on the rotating centrifuge pot 5. The useful load area 9, which is not magnetically non-active, of the centrifuge pot 5 can be made of lightweight, high-strength material to reduce its weight. The reduced weight means that lower forces are exerted on the radial magnetic bearings 2.2.1 and 2.2.2, axial magnetic bearing 2.3, and results in a lower energy consumption during the acceleration of the centrifuge pot 5.

To discharge the residual heat which is generated by the bearings, the changeable thread carrier tube 1 is pressurized with compressed air as the centrifuge pot 5 rotates. The compressed air escapes through the gap between the thread carrier tube 1 and the throat area of the centrifuge pot 5, and thus absorbs the thermal energy generated.

Figure 3:
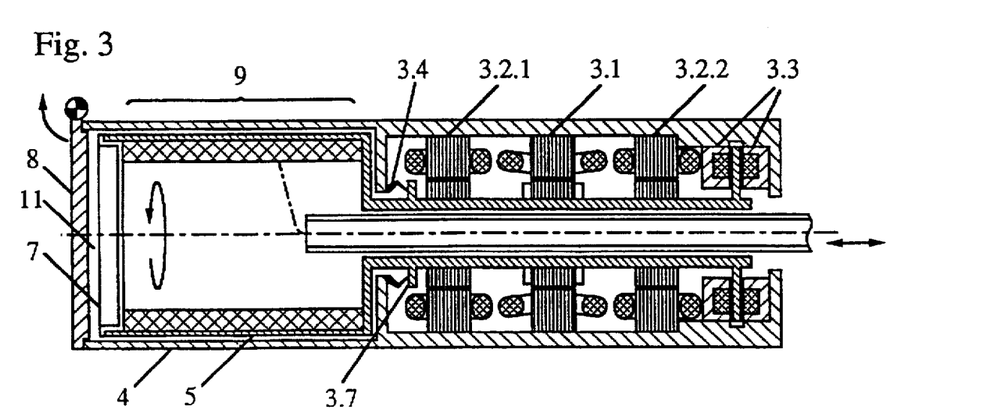
FIG. 3 is a schematic diagram of a vacuum spinning centrifuge mounted in a cantilevered manner with cooling of the magnetically active area by circulating outside air and a seal with positive transport action.

FIG. 3 is a schematic diagram of a vacuum centrifuge mounted in a cantilevered manner, the magnetically active components of which run in a normal atmosphere. Bottle-shaped centrifuge pot 5 with cover 7, similar to the arrangement illustrated in FIG. 2, is mounted in cantilevered fashion in a centrifuge housing 4. The centrifuge housing has a housing cover 8 for the removal of the batch of yarn spun in the centrifugal spinning process, or for the removal of residual fibers in the multi-stage spinning process. Adjacent to useful load area 9 is a seal 3.4, which seals the useful load part 9 of the centrifuge pot 5 against the outside air pressure. Seal surface 3.7 is oriented so that air flowing into the vacuum is transported outward by the rotating seal surface. To support the outward transport action, a helicoidal groove can be located on the seal surface. As illustrated in FIG. 3, first radial magnetic bearing 3.2.1, motor 3.1, second radial magnetic bearing 3.2.2 and axial magnetic bearing 3.3 are adjacent to the seal 3.4. In this embodiment, the additional cooling action is achieved because the magnetically active portion of the rotating centrifuge pot 5 also discharges thermal energy to the environmental air via its outside surface. The air friction which occurs is small due to the small outside diameter in the throat area of the centrifuge pot 5.

Figure 4:
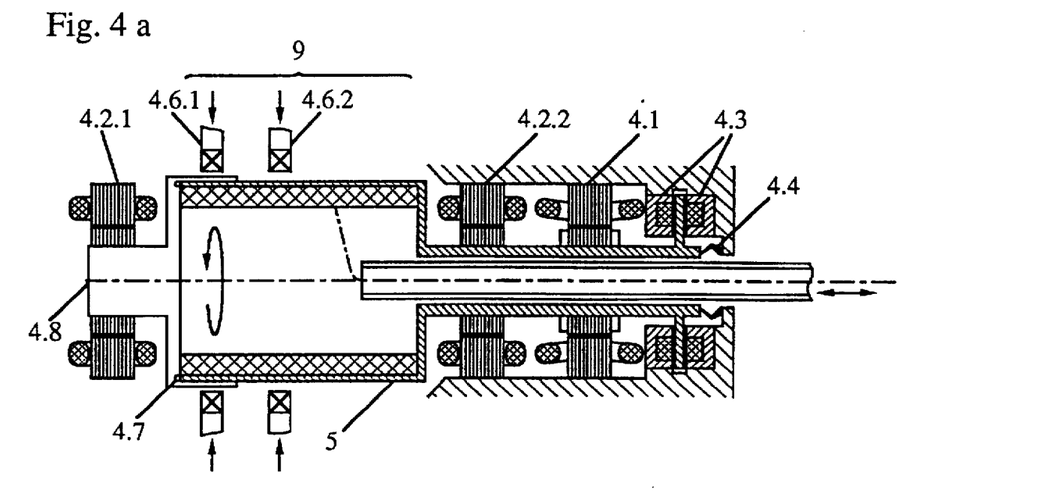
FIGS. 4a and 4a' are schematic diagram of a vacuum spinning centrifuge with a useful load area which can be divided into sections, closed and open, for the extraction of the yarn and the removal of the residual fibers, with magnetic bearings on both sides of the useful load area and corresponding auxiliary bearings for opening the useful load area.
FIGS. 4b and 4b' are schematic diagrams of the vacuum spinning centrifuge illustrated in FIG. 4a and 4a' with a loose sleeve which rotates along with the cover to hold the batch of spun yarn.

FIGS. 4a and 4a' are schematic illusrations of a vacuum spinning centrifuge with a useful load area which can be divided into different parts. In this embodiment, centrifuge pot 5 is closed by a sleeve-shaped cover 4.7. On its end, the cover has a short shaft 4.8 which is mounted in a radial magnetic bearing 4.2.1. Likewise, the centrifuge pot illustrated in FIGS. 4a, 4a', 4b and 4b' have an additional radial magnetic bearing 4.2.2, a motor 4.1, an axial magnetic bearing 4.3 and a seal 4.4. The radial magnetic bearings 4.2.1 and 4.2.2 can be laminated to eliminate the eddy current losses, since they are experienced on the cover 4.7, or on the centrifuge pot 5 on the small radius. The invention also teaches that if active magnetic bearings are used, the bearings are magnetized not radially, but along the axis of the rotor, so that lamination is unnecessary.

Such an embodiment is preferably used when large batches of yarn are to be spun. To reduce the weight, magnetically non-active useful load area 9 can be made of lightweight, high-strength material. The location of radial magnetic bearings 4.2.1 and 4.2.2 on the respective ends of the useful load area results in favorable dynamic properties when the heavy weight of the centrifuge is in rotation. There are auxiliary bearings 4.6.1 and 4.6.2 for centrifuge pot 5 and centrifuge cover 4.7 respectively. The spinning of the yarn material into the closed spinning centrifuge, as illustrated in FIG. 4a, takes place as illustrated in FIG. 1. When the spinning centrifuge is opened to remove the batch of yarn after the centrifugal spinning process, the speed of rotation of the rotating centrifuge pot 5 is reduced sharply. The auxiliary bearings 4.6.1 and 4.6.2 are then brought into contact with the centrifuge cover 4.7 and the centrifuge pot 5. When the centrifuge cover 4.7 and the centrifuge pot 5 are then separated, the auxiliary bearings 4.6.1 and 4.6.2 axially and radially stabilize the cover and the centrifuge pot. After the opening, the batch of yarn can be removed by suitable means as, for example, disclosed in PCT/EP 93/01078.

FIGS. 4b and 4b' illustrate an additional embodiment claimed by the invention, in which the shaft 4.9 corresponding to the cover is hollow and just as long as useful load area 9. Corresponding to the hollow shaft 4.9 is a sleeve 4.10 which rotates in a non-driven fashion along with it inside the shaft 4.9. If the spinning process is terminated following the centrifugal spinning process, the sleeve 4.10 is driven out of the shaft 4.9. The invention teaches that the expulsion can be achieved by pressurizing the sleeve with compressed air which is introduced through thread carrier tube 1, for example. Centrifuge pot 5 is then stopped. After the centrifuge pot 5 comes to a stop, the batch of yarn shrinks onto the sleeve 4.10. When the centrifuge pot 5 is stationary, cover 4.7 and centrifuge pot 5 can then be opened and no longer require any auxiliary bearings. For the multi-stage spinning process, the auxiliary bearings can also be eliminated, since the centrifuge pot 5 in this case need only be opened occasionally to remove residual fibers, which can also happen when the centrifuge pot is at a stop. In any case, the centrifuge pot 5 and the cover 4.7 are paired when they are stationary, so as not to exceed the radial and axial tolerances for the operation of the magnetic bearings.

Figure 5:
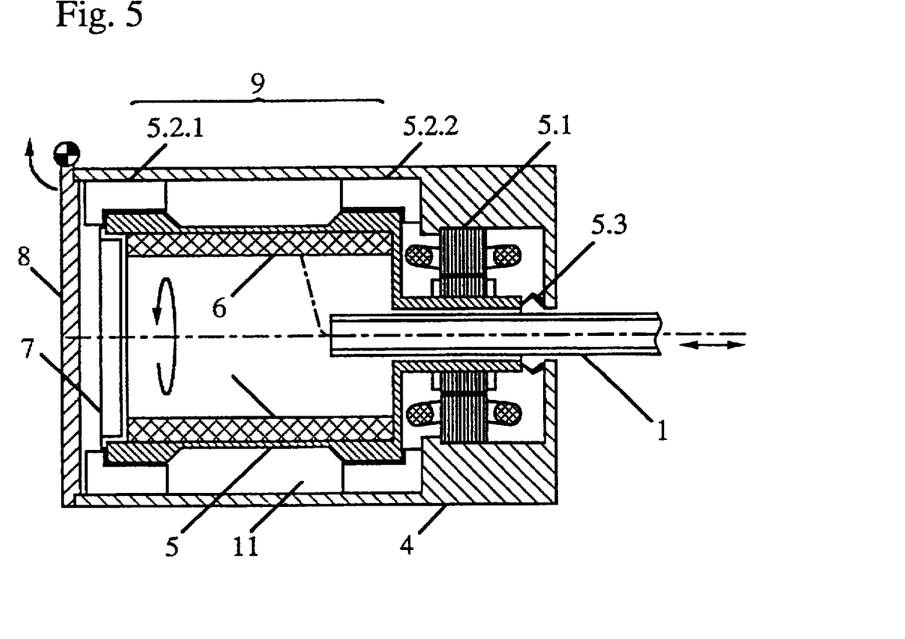
FIG. 5 is a schematic diagram of a vacuum spinning centrifuge with encompassing magnetic bearings in the useful load area and the cover.

FIG. 5 is a schematic diagram of a vacuum spinning centrifuge with encompassing magnetic bearings in useful load area 9 and in the cover. In this embodiment, active magnetic bearings are used which are magnetized not radially, but along the axis of the rotor, so that there is no need for lamination, since no eddy current losses occur on rotating centrifuge pot 5. The prior art discloses magnetic bearings which are realized in the form of encompassing magnetic bearings. These bearings can be used to stabilize a rotor with a minimum of active magnet elements in five degrees of freedom. Such magnetic bearings 5.2.1 and 5.2.2 are located at the respective ends of the useful load area 9 of the centrifuge pot 5, to keep the construction of the centrifuge simple. In this case, seal 5.3 is designed as a seal with a negative transport action, and consequently the entire centrifuge pot 5 can be removed, after removing the magnetic bearing, from the centrifuge housing. In the throat area of the centrifuge pot 5, projecting through the thread carrier tube 1 into the interior of the centrifuge, there is a motor 5.1 which is adjacent to the seal 5.3. Corresponding to the centrifuge housing 4 there is a cover 8 which, after centrifuge cover 7 has been opened, makes possible the periodic removal of the batch of yarn 6 in the centrifugal spinning process, or the occasional removal of any remaining yarn in the multi-stage spinning process.

Figure 6:
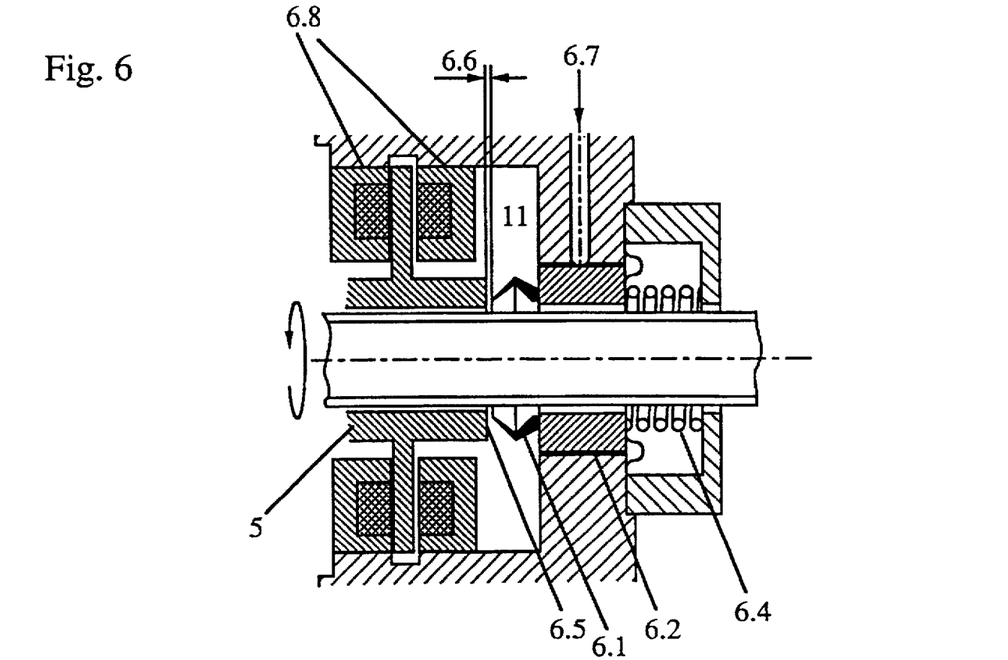
FIG. 6 is a schematic diagram of a seal system to seal the rotating centrifuge pot against the outside atmospheric air pressure.

FIG. 6 is a schematic illustration of a seal system which can be used to seal centrifuge pot 5 against outside air pressure when the pot is rotating in vacuum area 11. The seal system claimed by the invention consists of a seal lip 6.1 which is located on a seal support 6.2, and to which force is applied by a spring 6.4. Corresponding to the seal support 6.2 there is a brake 6.7. The end of the centrifuge pot 5 claimed by the invention is realized in the form of a seal surface 6.5, and is equipped with the corresponding axial magnetic bearing 6.8. The invention teaches that the sealing action is achieved when seal lip 6.1 sitting on the seal support 6.2 is pressed by the corresponding spring 6.4 with a defined force against the seal surface 6.5. Therefore, when the seal lip 6.1 is worn, the contact with the seal surface 6.5 of the centrifuge pot 5 can still be guaranteed. The corresponding brake 6.7 then holds the seal support 6.2 fast. The electronic system of the axial magnetic bearing then enlarges seal gap 6.6 until the total friction of the centrifuge pot 5 becomes minimal. The total friction, which consists of the air friction and the friction of the seal lip, is functionally related to the size of the seal gap 6.6, and can be determined by the electronic system by the evaluation of the motor torque. The size of the seal gap 6.6 can be determined, for example, by means of the temperature of the seal, the amount of light passing through the seal gap, the vibration of the seal, the measurement of the current of leaking air, the measurement of the deformation of the seal, the torque on the seal or the motor torque.

The invention also teaches that the function of the spring can be taken over by the electronic system of the magnetic bearing. For this purpose, a conductive seal lip 6.1 or a seal lip 6.1 provided with a conductive layer can be located on now immobile seal support 6.2, so that it closes an electrical contact when it comes into contact with the seal surface 6.5 of centrifuge pot 5. The axial magnetic bearing 6.8 then functions as an actuator, and moves the centrifuge pot 5 with its corresponding seal surface 6.5 toward the seal lip 6.1, until the electrical contact is closed. The electronic system of the axial magnetic bearing then in turn enlarges seal gap 6.6 until the total friction of the centrifuge pot 5 has become minimal. To improve the sealing action, the seal surface of the centrifuge pot can be located so that there is a positive transport effect, i.e. so that the air flowing into the vacuum is transported outward. The invention also teaches that the seal surface can be provided with a helicoidal groove to increase the transport action.

Sealing gap 6.6 can be adjusted periodically, e.g. at the beginning or end of each spinning cycle, or continuously during the entire spinning cycle.

Having described presently preferred embodiments of the invention, it is to be understood that it may be otherwise embodied within the scope of the appended claims.

We claim:

1. A vacuum centrifuge having an elongated thread carrier tube, a cylindrical centrifuge housing forming a vacuum chamber and a cylindrical centrifuge pot coaxial with said elongated thread carrier tube, said cylindrical centrifuge housing and said cylindrical centrifuge pot have a diameter greater than the diameter of said elongated thread carrier tube and said cylindrical centrifuge pot having a smaller diameter portion forming a hollow shaft having a diameter less than the rest of the centrifuge pot and coaxial with and surrounding a longitudinal portion of said elongated thread carrier tube, and at least one of a magnetic bearing and a motor surrounding said smaller diameter portion of said cylindrical centrifuge pot, wherein said cylindrical centrifuge pot has a base part which includes an elongated coaxial external auxiliary shaft, at least one other magnetic bearing surrounding said elongated auxiliary shaft which acts on it and a seal surrounding said hollow shaft.

2. A vacuum centrifuge as set forth in claim 1 wherein a substantial portion of the length of said elongated hollow shaft is located within said vacuum chamber.

3. A vacuum centrifuge as set forth in claim 2 wherein said auxiliary shaft forms an interior passage which receives a portion of said elongated thread carrier tube.

4. A vacuum centrifuge as set forth in claim 1 wherein said elongated hollow shaft forms an interior passage which receives a portion of said elongated thread carrier tube.

5. A vacuum centrifuge as set forth in claim 1 having at least one:

A) a cavity located between said elongated thread carrier tube and the hollow shaft of said cylindrical centrifuge pot, whereby said vacuum centrifuge is cooled in the vicinity of said motor by air passing through said cavity;

B) a seal located between said vacuum chamber and said cylindrical centrifuge pot, said seal being oriented so that the at least one magnetic bearing and motor which produce thermal losses rotate in air to discharge heat to the circulating air;

C) at least one active magnetic bearing mounting said cylindrical centrifuge pot, the field lines of said active magnetic bearing being oriented at least one of radially and along the axis of said cylindrical centrifuge pot, and wherein said cylindrical centrifuge pot is made of a ferromagnetic material;

D) a seal located between the vacuum chamber and the centrifuge pot, a seal surface located on the hollow shaft and a seal gap located between the seal surface and the seal;

E) a seal located between the vacuum chamber and the centrifuge pot, a seal surface located on the hollow shaft, a seal gap located between the seal surface and the seal and means for regulating the seal gap for said vacuum centrifuge by regulating said magnetic bearing.

6. A vacuum centrifuge having an elongated thread carrier tube, a cylindrical centrifuge housing forming a vacuum chamber and a cylindrical centrifuge pot coaxial with said elongated thread carrier tube, said cylindrical centrifuge pot having an elongated hollow shaft extending externally and coaxially therefrom, said elongated hollow shaft forming a passage for said elongated thread carrier tube, at least one magnetic bearing surrounding said elongated hollow shaft, a motor surrounding said elongated hollow shaft, and an annular wall connecting a terminal end of said elongated hollow shaft to said cylindrical centrifuge pot and forming a boundary surface between said vacuum chamber and the interior of said cylindrical centrifuge pot, wherein said cylindrical centrifuge pot has a base part which includes an elongated coaxial external auxiliary shaft, and at least one other magnetic bearing surrounding said auxiliary shaft and a seal surrounding said hollow shaft.

7. A vacuum centrifuge having an elongated thread carrier tube, a cylindrical centrifuge housing forming a vacuum chamber and a cylindrical centrifuge pot coaxial with said elongated thread carrier tube, said cylindrical centrifuge pot having an elongated hollow shaft extending externally and coaxially therefrom, said elongated hollow shaft forming a passage for said elongated thread carrier tube, at least one magnetic bearing surrounding said elongated hollow shaft, a motor surrounding said elongated hollow shaft, and an annular wall connecting a terminal end of said elongated hollow shaft to said cylindrical centrifuge pot and forming a boundary surface between said vacuum chamber and the interior of said cylindrical centrifuge pot, wherein a substantial portion of the length of said elongated hollow shaft is located within said vacuum chamber, wherein said cylindrical centrifuge pot has a base part which includes an elongated coaxial external auxiliary shaft, at least one other magnetic bearing surrounding said auxiliary shaft and a seal surrounding said hollow shaft.

* * * * *

UNITED STATES PATENT AND TRADEMARK OFFICE
CERTIFICATE OF CORRECTION

PATENT NO. : 5,720,160
DATED : February 24, 1998
INVENTOR(S) : Alfons Traxler and Friedrich König It is certified that error appears in the above-identified patent and that said Letters Patent is hereby corrected as shown below:

Title Page, in the Title: "VACCUM" should read --VACUUM--.

Column 1 Line 1 "VACCUM" should read --VACUUM--.

Column 1 Line 8 "called centrifugal" should read --called a centrifuge--.

Column 4 Line 17 "diagram" should read --diagrams--.

Column 4 Line 23 after semicolon delete --and--.

Column 4 Line 25 "Fig." should read --Figs.--.

Column 5 Line 3 after "tube" delete --for--.

Claim 5 Column 8 Line 35 after "at least one" insert --of--.

Claim 5 Column 8 Line 56 after semicolon insert --and--.

Signed and Sealed this

Twenty-first Day of July, 1998

Attest:

BRUCE LEHMAN

*Attesting Officer*        *Commissioner of Patents and Trademarks*